United States Patent
Lee et al.

(10) Patent No.: US 7,606,964 B2
(45) Date of Patent: *Oct. 20, 2009

(54) VIRTUAL USB FLASH MEMORY STORAGE DEVICE WITH PCI EXPRESS INTERFACE, CONTROLLER AND METHOD THEREOF

(75) Inventors: Kian-Leng Lee, Hsinchu (TW); Wee-Kuan Gan, Hsinchu (TW)

(73) Assignee: Phison Electronics Corp., Hsinchu (TW)

( * ) Notice: Subject to any disclaimer, the term of this patent is extended or adjusted under 35 U.S.C. 154(b) by 158 days.

This patent is subject to a terminal disclaimer.

(21) Appl. No.: 11/747,236

(22) Filed: May 11, 2007

(65) Prior Publication Data

US 2007/0214306 A1 Sep. 13, 2007

Related U.S. Application Data

(63) Continuation of application No. 10/906,937, filed on Mar. 14, 2005, now Pat. No. 7,222,211.

(51) Int. Cl.
*G06F 13/00* (2006.01)

(52) U.S. Cl. ................ 710/315; 710/302; 711/115

(58) Field of Classification Search ............. 710/302, 710/315; 711/115
See application file for complete search history.

(56) References Cited

U.S. PATENT DOCUMENTS

| | | | |
|---|---|---|---|
| 6,292,863 B1 * | 9/2001 | Terasaki et al. | 710/313 |
| 7,073,010 B2 * | 7/2006 | Chen et al. | 710/313 |
| 7,222,211 B2 * | 5/2007 | Lee et al. | 710/315 |
| 2005/0120163 A1 * | 6/2005 | Chou et al. | 711/103 |
| 2005/0138288 A1 * | 6/2005 | Chou et al. | 711/115 |
| 2005/0160213 A1 * | 7/2005 | Chen | 710/305 |
| 2005/0240713 A1 * | 10/2005 | Wu et al. | 710/314 |
| 2006/0168391 A1 * | 7/2006 | Gan et al. | 711/103 |
| 2006/0212640 A1 * | 9/2006 | Lee et al. | 710/315 |

* cited by examiner

*Primary Examiner*—Glenn A Auve
(74) *Attorney, Agent, or Firm*—Jianq Chyun IP Office

(57) ABSTRACT

A virtual universal serial bus (USB) flash memory storage device with a peripheral component interconnect (PCI) Express interface including a microcontroller connected separately to a flash memory and a PCI Express connecting interface, and the microcontroller has a flash memory interface, a PCI Express interface and a virtual USB module and the virtual USB module includes a USB host and a USB device. If a host gives a USB instruction for saving or reading to the storage device, the USB instruction will be sent to and executed by the virtual USB module and the required data processing for saving or reading will be completed through the flash memory interface and the flash memory. The data in the storage device can be transmitted with a PCI Express standard transmission rate, and the host considers the storage device as a USB device instead of a pure PCI Express device.

11 Claims, 2 Drawing Sheets

VIRTUAL USB FLASH MEMORY STORAGE DEVICE WITH PCI EXPRESS INTERFACE, CONTROLLER AND METHOD THEREOF

CROSS-REFERENCE TO RELATED APPLICATION

This application is a continuation application of patent application Ser. No. 10/906,937, filed on Mar. 14, 2005 and now allowed. The entirety of the above-mentioned patent application is hereby incorporated by reference herein and made a part of this specification.

BACKGROUND OF THE INVENTION

1. Field of Invention

The present invention relates to a virtual universal serial bus (USB) flash memory with a peripheral component interconnect (PCI) Express interface, and more particularly to a virtual USB flash memory storage device that uses the PCI Express interface as a transmission interface, a controller and a method thereof.

2. Description of Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 Mb/s of the universal serial bus (USB), and the present PCI Express interface with a transmission rate of 133 MB/s upgrades the transmission rate of its lane to 250 MB/s which becomes a new-generation peripheral component interconnect (PCI) Express interface. The PCI Express interface further supports a hot-plug control function. Therefore, the PCI Express interface is extensively accepted by users.

Further, the flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly. The flash memory replaces traditional storage medium such as a hard disk drive in many applications, but most of the present storage devices made of flash memories use the universal serial bus (USB) or integrated drive electronics (IDE) interface as the transmission interface. The transmission rate of the USB and IDE interface are just 480 Mb/s and 160 MB/s respectively, and such transmission rates cannot catch up with the accessing speed of the flash memory. Therefore, the applications of the storage device made of this kind of flash memory is restricted by the USB or IDE interface of the host, and its performance cannot be maximized.

Further, a software developing system or a software program usually provides several environment interfaces that integrate editing, compiling, debugging, file management and execution. The environment interface lets programmers develop a majority of an application program, and thus the software executed at the host end is communicated by a specific environment interface and peripherals. A peripheral must have the environment interface of the host before the peripheral can execute an instruction transmitted from the host.

Therefore, using a bus with a faster transmission rate as a transmission interface to maximize the performance of a memory card is an important subject for manufacturers in the related field to make further improvements.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express interface as a transmission interface between a host and a storage device, and the storage device installs a microcontroller having a virtual USB module, such that the data transmission rate of the PCI Express interface can be maximized when data is accessed by a flash memory of the storage device and the host.

The invention provides a flash storage device. The flash storage device includes a microcontroller, a flash memory and a PCI Express connecting interface. The microcontroller has a flash memory interface, a PCI Express interface, and a virtual USB module. The virtual USB module includes a virtual USB host for receiving a USB instruction from a host and a virtual USB device for executing the USB instruction. The virtual USB module is implemented by firmware program to be executed by the microcontroller. The flash memory is coupled to the microcontroller and capable of saving data into and reading data from the flash memory. The PCI Express connecting interface is capable of being coupled to a PCI Express bus disposed between the host and the flash storage device. When the storage device is coupled to the host, the microcontroller of the storage device notifies the host that the storage device is an USB storage device. When the host reads the data stored in the flash memory, the USB instruction from the host is sent to the virtual USB module to be executed by the virtual USB module, and the data in the flash memory is converted by the flash memory interface or the PCI Express interface of the microcontroller into a data format acceptable by the PCI Express bus, and then the data is sent to the host.

The invention provides a controller, coupled to a flash memory and a PCI Express connecting interface. The PCI Express connecting interface is capable of being connected to a PCI Express bus disposed between a host and a flash storage device and is provided for coupling the controller to the host. The controller includes a flash memory interface, a PCI Express interface and a virtual USB module. The virtual USB module is capable of receiving an instruction given by the host. The virtual USB module has an virtual USB host for receiving an USB instruction given by the host and an virtual USB device for executing the USB instruction. The virtual USB module is implemented by a firmware program to be executed by the controller. When the flash storage device is connected to the host, the controller notifies the host that the controller is an USB host. When the host reads data stored in the flash memory, the USB instruction given by the host is sent to the virtual USB module to be executed by the virtual USB module, and the data in the flash memory is converted by the flash memory interface or the PCI Express interface of the controller into a data format acceptable by the PCI Express bus, and then the converted data is sent to the host.

The invention provides a method for interfacing between a flash storage device and a host. The flash storage device includes a PCI Express connecting interface, a flash memory and a controller interconnected therebetween. The PCI Express connecting interface is capable of being connected to a PCI Express bus disposed between the host and the flash storage device and is provided for coupling the controller to the host. The method includes notifying the host that the storage device is an USB storage device when the flash storage device is connected to the host. The host issues an USB saving instruction to the flash storage device, and the USB saving instruction is executed by the controller and data from the host for saving is converted by the controller into a data format acceptable to the flash memory and is stored in the flash memory. The host issues an USB reading instruction to the flash storage device, and the USB reading instruction is executed by the controller, and the data in the flash memory is converted by the controller into a data format acceptable by the PCI Express bus, and then the converted data is sent to the host.

In one embodiment, the invention provides a storage device includes a microcontroller, and the microcontroller is coupled separately to a flash memory and a PCI Express connecting interface connected to a PCI Express bus of a host, and the microcontroller has a flash memory interface, a PCI Express interface and a virtual USB module, such that when the host gives a USB instruction for saving or reading data in a storage device, the instruction will be sent to the virtual USB module first and the instruction is executed and completed by the virtual USB module. The data in the flash memory of the storage device will be processed according to the instruction, and the flash memory interface and the PCI Express interface installed in the microcontroller are used to covert the data into a format acceptable by the flash memory or the PCI Express bus. The converted data will be sent to the host or the flash memory, so that the host can give a USB instruction to the storage device for accessing data through the virtual USB module, and the data transmission rate can achieve the transmission rate provided by the PCI Express interface, so as to maximize the transmission rate of the storage device without losing the USB properties.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
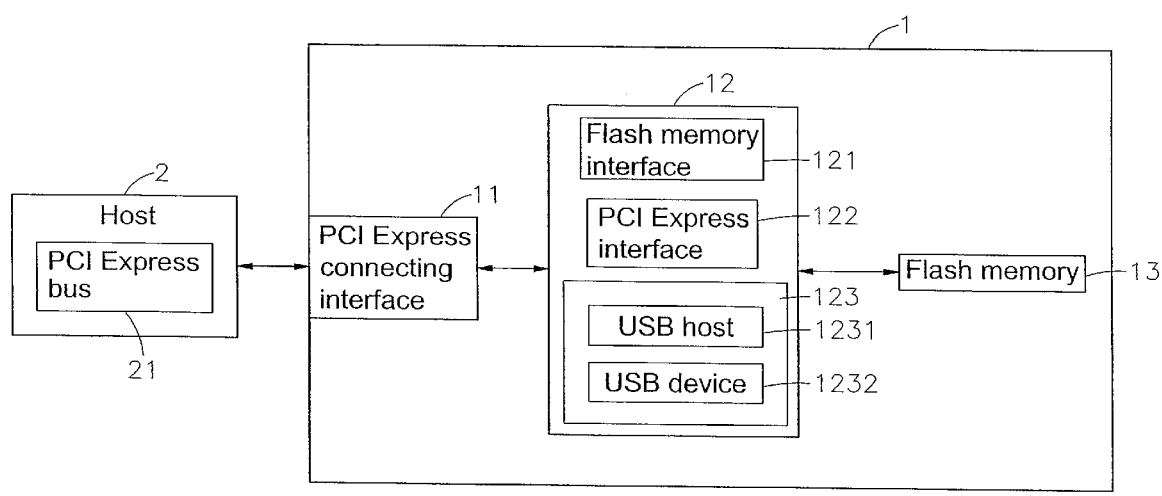
FIG. 1 is a block diagram according to a preferred embodiment of the present invention.

In FIG. 1, a storage device 1 of the present invention comprises a PCI Express connecting interface 11, a microcontroller 12 and a flash memory 13.

The PCI Express connecting interface 11 is provided for connecting to a PCI Express bus 21 built in a host 2.

The microcontroller 12 includes a flash memory interface 121, a PCI Express interface 122 and a virtual USB module 123, and the virtual USB module 123 includes an USB host 1231 and USB device 1232, and the microcontroller 12 is connected to the PCI Express connecting interface 11, and the virtual USB module 123 is not physical, but it is virtual and simulated by a designer's firmware program.

The flash memory 13 is connected to the microcontroller 12.

If the PCI Express connecting interface 11 built in the storage device 1 is connected to the PCI Express bus 21 built in the host 2, the microcontroller 12 of the storage device 1 will declare to the host 2 that the storage device 1 is a USB host, such that the host 2 will consider the microcontroller 12 as a USB host, even though the host 2 remains communicating with the microcontroller 12 by the PCI Express architecture.

When the host 2 gives a USB instruction for storing data, the instruction will be sent to the USB host 1231 installed in the virtual USB module 123 of the microcontroller 2 first, and then the USB host 1231 will send the instruction to the USB device 1232, and the USB device 1232 will complete the execution of the instruction. At that time, the data of the host 2 will be sent to the mircocontroller 12 through the PCI Express bus 21 and the PCI Express connecting interface 11, and the flash memory interface 121 built in the microcontroller 12 will convert the data into a data format acceptable by the flash memory 3, and the data is stored in the flash memory 3.

Further, when the host 2 wants to read a data stored in the storage device 1, the USB instruction will be sent to the USB host 1231 built in the virtual USB module 123 of the microcontroller 12 first, and then the USB host 1231 will sent the instruction to an USB device 1232, and the USB device 1232 will complete the execution of the instruction. At that time, the flash memory 3 will send the data to the microcontroller 12, and the PCI Express interface 122 built in the microcontroller 12 will convert the data into a data format acceptable by the PCI Express bus 21, and then the data is sent to the host 2 through the PCI Express connecting interface 11 and the PCI Express bus 21.

From the description above, when the host 2 reads or stores data of the storage device 1, the data is read from or written into the flash memory 3 through the microcontroller 12, and the read or write instruction is executed and completed by the USB host 1231 and the USB device 1232 built in the virtual USB module 123. Therefore, the host 2 considers the storage device 1 as an USB storage device with a PCI Express interface.

Further, if the instruction given by the host 2 does not need any data processing, such instruction will be executed and completed in the virtual USB module 123, and the microcontroller 12 will not communicate with the flash memory 13.

Figure 2:
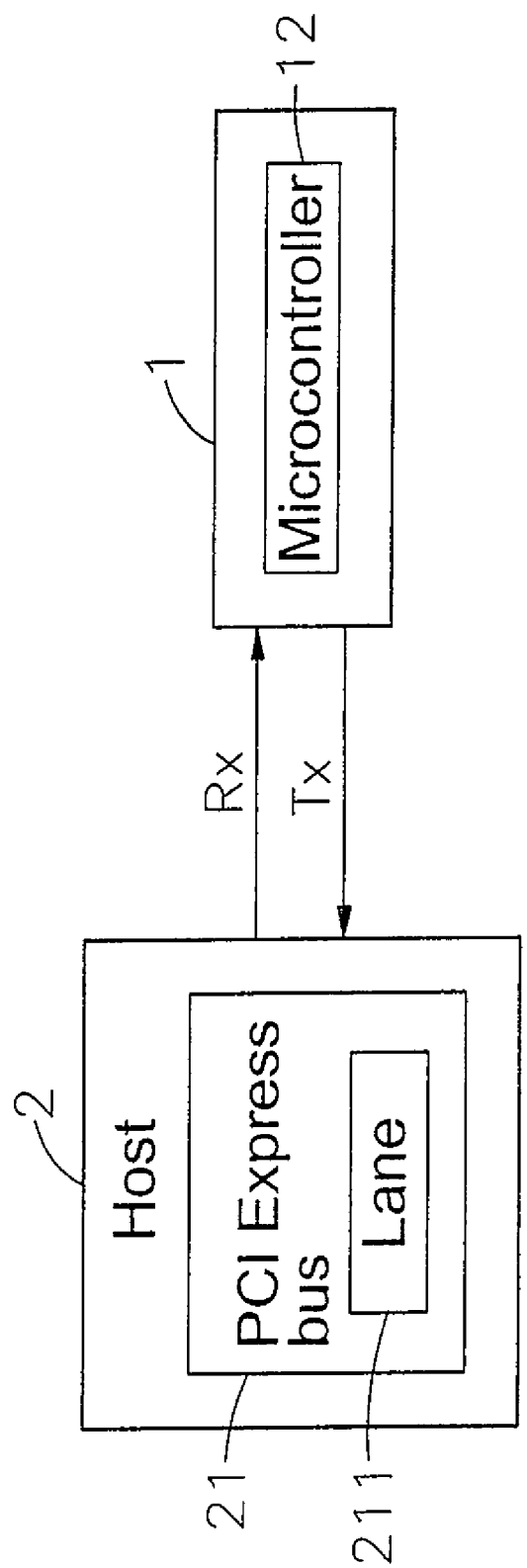
FIG. 2 is a schematic diagram of a data transmission according to a preferred embodiment of the present invention.

In FIG. 2, the host 2 and the storage device 1 has a lane 211 at a physical layer for transmitting data, and the lane 211 is comprised of a transmitting end (Tx) and a receiving end (Rx), and the quantity of the lane 211 could be one or more.

Therefore, the key for the virtual USB flash memory storage device with PCI Express interface in accordance with the present invention to improve the prior arts resides on that the present invention uses a USB host and a USB device built in the storage device to execute the instruction given by the host and also uses a PCI Express interface as the transmission interface between the host and the storage device, such that the data can be transmitted at a transmission rate that can meet the PCI Express standard, and the storage device can have the best transmission rate.

A prototype of virtual USB flash memory storage device with PCI Express interface has been constructed with the features of FIGS. 1~2. The virtual USB flash memory storage device with PCI Express interface functions smoothly to provide all of the features discussed earlier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash storage device, comprising:
   a microcontroller having a flash memory interface, a PCI Express interface, and a virtual USB module, the virtual USB module including a virtual USB host for receiving a USB instruction from a host and a virtual USB device for executing the USB instruction, the virtual USB module being implemented by firmware program to be executed by the microcontroller;
   a flash memory coupled to the microcontroller and capable of saving data into and reading data from the flash memory; and
   a PCI Express connecting interface capable of being coupled to a PCI Express bus disposed between the host and the flash storage device;
   wherein when the storage device is coupled to the host, the microcontroller of the storage device notifies the host that the storage device is a USB storage device, and
   wherein when the host reads the data stored in the flash memory, the USB instruction from the host is sent to the virtual USB module to be executed by the virtual USB module, and the data in the flash memory is converted by the flash memory interface or the PCI Express interface of the microcontroller into a data format acceptable by the PCI Express bus, and then the data is sent to the host.

2. The flash storage device as claimed in claim 1, wherein the host and the storage device have only one lane at a physical layer for transmitting data, and the lane comprises a transmitting end (Tx) and a receiving end (Rx).

3. The flash storage device as claimed in claim 1, wherein the host and the storage device have more than one lane at a physical layer for transmitting data, and the lanes comprise a transmitting end (Tx) and a receiving end (Rx).

4. A controller, coupled to a flash memory and a PCI Express connecting interface, wherein the PCI Express connecting interface is capable of being connected to a PCI Express bus disposed between a host and a flash storage device and provided for coupling the controller to the host, the controller comprising:
   a flash memory interface, for interfacing with the flash memory;
   a PCI Express interface, for interfacing with the PCI Express connecting interface; and
   a virtual USB module capable of receiving an instruction given by the host, the virtual USB module having an virtual USB host for receiving a USB instruction given by the host and an virtual USB device for executing the USB instruction, the virtual USB module being implemented by a firmware program to be executed by the controller,
   wherein when the flash storage device is connected to the host, the controller notifies the host that the controller is a USB host,
   wherein when the host reads data stored in the flash memory, the USB instruction given by the host is sent to the virtual USB module to be executed by the virtual USB module, and the data in the flash memory is converted by the flash memory interface or the PCI Express interface of the controller into a data format acceptable by the PCI Express bus, and then the converted data is sent to the host.

5. The controller as claimed in claim 4, wherein the host and the flash storage device have only one lane at a physical layer for transmitting data, and the lane comprises a transmitting end (Tx) and a receiving end (Rx).

6. The controller as claimed in claim 4, wherein the host and the flash storage device have more than one lane at a physical layer for transmitting data, and the lanes comprise a transmitting end (Tx) and a receiving end (Rx).

7. An apparatus, comprising:
   a microcontroller having a flash memory interface, a PCI Express interface, and a virtual USB module capable of receiving an instruction given by a host, the virtual USB module being implemented by a firmware program to be executed by the microcontroller;
   a flash memory coupled to the microcontroller for storing data; and
   a PCI Express connecting interface capable of being connected to a PCI Express bus disposed between the host and the apparatus and provided for coupling the microcontroller to the host;
   wherein when the apparatus is connected to the host, the microcontroller notifies the host that the apparatus is a USB storage device, and
   wherein when the host reads the data stored in the flash memory, a USB instruction given by the host is sent to and executed by the virtual USB module, and the data in the flash memory is converted by the flash memory interface or the PCI Express interface of the microcontroller into a data format acceptable by the PCI Express bus, and then the converted data is sent to the host.

8. The apparatus as claimed in claim 7, wherein the host and the apparatus have only one lane at a physical layer for transmitting data, and the lane comprises a transmitting end (Tx) and a receiving end (Rx).

9. The apparatus as claimed in claim 7, wherein the host and the apparatus have more than one lane at a physical layer for transmitting data, and the lanes comprise a transmitting end (Tx) and a receiving end (Rx).

10. A method for interfacing between a flash storage device and a host, the flash storage device comprising a PCI Express connecting interface, a flash memory and a controller interconnected therebetween, the PCI Express connecting interface capable of being connected to a PCI Express bus disposed between the host and the flash storage device and provided for coupling the controller to the host, the method comprising:
    notifying the host that the storage device is a USB storage device when the flash storage device is connected to the host;
    the host issuing a USB saving instruction to the flash storage device, the USB saving instruction being executed by the controller and data from the host for saving is converted by the controller into a data format acceptable to the flash memory and is stored in the flash memory; and the host issuing a USB reading instruction to the flash storage device, the USB reading instruction being executed by the controller, and the data in the flash memory is converted by the controller into a data format acceptable by the PCI Express bus, and then the converted data is sent to the host.

11. The method as claimed in claim 10, wherein a plurality of USB instructions issued by the host are executed by a virtual USB module being implemented by a firmware program in the controller.

* * * * *